US007991978B2

(12) United States Patent
Kuesel et al.

(10) Patent No.: US 7,991,978 B2
(45) Date of Patent: Aug. 2, 2011

(54) NETWORK ON CHIP WITH LOW LATENCY, HIGH BANDWIDTH APPLICATION MESSAGING INTERCONNECTS THAT ABSTRACT HARDWARE INTER-THREAD DATA COMMUNICATIONS INTO AN ARCHITECTED STATE OF A PROCESSOR

(75) Inventors: Jamie R. Kuesel, Rochester, MN (US); Mark G. Kupferschmidt, Afton, MN (US); Eric O. Mejdrich, Rochester, MN (US); Paul E. Schardt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 12/118,272

(22) Filed: May 9, 2008

(65) Prior Publication Data
US 2009/0282214 A1    Nov. 12, 2009

(51) Int. Cl.
*G06F 15/00* (2006.01)
*G06F 15/76* (2006.01)
(52) U.S. Cl. .......................................... 712/11; 712/209
(58) Field of Classification Search ................... 712/11
See application file for complete search history.

(56) References Cited

U.S. PATENT DOCUMENTS

| | | | |
|---|---|---|---|
| 4,813,037 A | 3/1989 | Debuysscher et al. | |
| 5,590,308 A | 12/1996 | Shih | |
| 5,761,516 A | 6/1998 | Rostoker et al. | |
| 5,870,479 A | 2/1999 | Feiken et al. | |
| 5,884,060 A | 3/1999 | Vegesna et al. | |
| 5,974,487 A * | 10/1999 | Hartmann | 710/100 |
| 5,974,498 A | 10/1999 | Hartmann | |
| 6,047,122 A | 4/2000 | Spiller | |
| 6,085,315 A | 7/2000 | Fleck et al. | |
| 6,101,599 A | 8/2000 | Wright et al. | |
| 6,145,072 A | 11/2000 | Shams et al. | |
| 6,151,668 A | 11/2000 | Pechanek et al. | |
| 6,292,888 B1 | 9/2001 | Nemirovsky et al. | |

(Continued)

FOREIGN PATENT DOCUMENTS
CN    1599471    3/2005

OTHER PUBLICATIONS
Office Action Dated Jan. 29, 2010 in U.S. Appl. No. 11/945,396.

(Continued)

*Primary Examiner* — Eddie Chan
*Assistant Examiner* — Corey Faherty
(74) *Attorney, Agent, or Firm* — Biggers & Ohanian, LLP

(57) ABSTRACT

Data processing on a network on chip ('NOC') that includes integrated processor ('IP') blocks, each of a plurality of the IP blocks including at least one computer processor, each such computer processor implementing a plurality of hardware threads of execution; low latency, high bandwidth application messaging interconnects; memory communications controllers; network interface controllers; and routers; each of the IP blocks adapted to a router through a separate one of the low latency, high bandwidth application messaging interconnects, a separate one of the memory communications controllers, and a separate one of the network interface controllers; each application messaging interconnect abstracting into an architected state of each processor, for manipulation by computer programs executing on the processor, hardware inter-thread communications among the hardware threads of execution; each memory communications controller controlling communication between an IP block and memory; each network interface controller controlling inter-IP block communications through routers.

22 Claims, 9 Drawing Sheets

U.S. PATENT DOCUMENTS

| | | | |
|---|---|---|---|
| 6,446,171 | B1 | 9/2002 | Henriksen |
| 6,561,895 | B2 | 5/2003 | Scales |
| 6,567,895 | B2 | 5/2003 | Scales |
| 6,668,308 | B2 | 12/2003 | Barroso et al. |
| 6,675,284 | B1 | 1/2004 | Warren |
| 6,725,317 | B1 | 4/2004 | Bouchier et al. |
| 6,823,429 | B1 | 11/2004 | Olnowich |
| 6,891,828 | B2 | 5/2005 | Ngai |
| 6,915,402 | B2 | 7/2005 | Wilson et al. |
| 6,950,438 | B1 | 9/2005 | Owen et al. |
| 6,973,032 | B1* | 12/2005 | Casley et al. ............. 370/230 |
| 6,988,149 | B2 | 1/2006 | Odenwald |
| 7,072,996 | B2 | 7/2006 | Adusumilli et al. |
| 7,162,560 | B2 | 1/2007 | Taylor et al. |
| 7,376,789 | B2 | 5/2008 | Halleck et al. |
| 7,394,288 | B1 | 7/2008 | Agarwal |
| 7,398,374 | B2 | 7/2008 | DeLano |
| 7,464,197 | B2 | 12/2008 | Ganapathy et al. |
| 7,493,474 | B1 | 2/2009 | Pechanek et al. |
| 7,500,060 | B1 | 3/2009 | Anderson et al. |
| 7,502,378 | B2 | 3/2009 | Lajolo et al. |
| 7,521,961 | B1 | 4/2009 | Anderson et al. |
| 7,533,154 | B1 | 5/2009 | Chen et al. |
| 7,546,444 | B1 | 6/2009 | Wolrich et al. |
| 7,568,064 | B2 | 7/2009 | Reblewski et al. |
| 7,590,774 | B2 | 9/2009 | Johns et al. |
| 7,689,738 | B1 | 3/2010 | Williams et al. |
| 2002/0099833 | A1 | 7/2002 | Steely et al. |
| 2002/0178337 | A1 | 11/2002 | Wilson et al. |
| 2003/0065890 | A1 | 4/2003 | Lyon |
| 2004/0083341 | A1 | 4/2004 | Robinson et al. |
| 2004/0088487 | A1 | 5/2004 | Barroso et al. |
| 2004/0151197 | A1* | 8/2004 | Hui ............................. 370/412 |
| 2004/0250046 | A1 | 12/2004 | Gonzalez et al. |
| 2004/0260906 | A1 | 12/2004 | Landin et al. |
| 2005/0086435 | A1 | 4/2005 | Todoroki |
| 2005/0166205 | A1 | 7/2005 | Oskin et al. |
| 2005/0198442 | A1 | 9/2005 | Mandler |
| 2005/0203988 | A1 | 9/2005 | Nolle et al. |
| 2005/0238035 | A1 | 10/2005 | Riley |
| 2006/0209846 | A1 | 9/2006 | Clermidy et al. |
| 2006/0242393 | A1 | 10/2006 | Park et al. |
| 2007/0055826 | A1 | 3/2007 | Morton et al. |
| 2007/0076739 | A1 | 4/2007 | Manjeshwar et al. |
| 2008/0134191 | A1 | 6/2008 | Warrier et al. |
| 2008/0186998 | A1 | 8/2008 | Rijpkerna |
| 2009/0083263 | A1 | 3/2009 | Felch et al. |
| 2009/0282222 | A1 | 11/2009 | Hoover et al. |

OTHER PUBLICATIONS

Final Office Action Dated Jan. 15, 2010 in U.S. Appl. No. 12/031,733.
David Taylor, et al. "System on Chip Packet Processor for an Experimental Network Service Platform". 2003.
Office Action Dated Mar. 30, 2010 in U.S. Appl. No. 11/926,212.
Final Office Action Dated May 19, 2010 in U.S. Appl. No. 11/945,396.
INTEL, E8870 Chipset, Intel, Jun. 2002, pp. 1-10.
Office Action Dated Apr. 2, 2010 in U.S. Appl. No. 11/955,553.
Kumar, et al. "A Network on Chip Architecture and Design Methodology". Published 2002, pp. 1-8, ISBN 0/7695-1486-03/02 by IEEE.
Bolotin, et al. "The Power of Priority: NoC based Distributed Cache Coherency". Published May 21, 2007, pp. 117-126, ISBN 0/7695-2773-06/07 by IEEE.
Office Action Dated Mar. 24, 2010 U.S. Appl. No. 12/031,733.
Virtanen, et al. "NoC Interface for a Protocol Processor". University of Turku.
Walter, et al., "BENoC: A Bus-Enhanced Network on-Chip". Dec. 2007, Technion, Israel Institute of Technology, Haifa, Israel.
Office Action Dated Jun. 8, 2010, U.S. Appl. No. 12/118,298.
Office Action Dated May 26, 2010, U.S. Appl. No. 12/117,875.
U.S. Appl. No. 12/117,897, filed May 9, 2008, Hoover et al.
U.S. Appl. No. 12/031,733, filed Feb. 15, 2008, Hoover et al.
U.S. Appl. No. 12/108,846, filed Apr. 24, 2008, Kuesel et al.
U.S. Appl. No. 12/108,770, filed Apr. 24, 2008, Mejdrich et al.
U.S. Appl. No. 12/029,647, filed Feb. 12, 2008, Hoover et al.
U.S. Appl. No. 12/118,017, filed May 9, 2008, Comparan et al.
U.S. Appl. No. 12/118,059, filed May 9, 2008, Mejdrich et al.
U.S. Appl. No. 12/117,875, filed May 9, 2008, Hoover et al.
U.S. Appl. No. 12/121,222, filed May 15, 2008, Kriegel et al.
U.S. Appl. No. 11/936,873, filed Nov. 8, 2007, Hoover et al.
U.S. Appl. No. 12/135,364, filed Jun. 9, 2008, Hoover et al.
U.S. Appl. No. 11/937,579, filed Nov. 9, 2007, Mejdrich et al.
U.S. Appl. No. 12/102,033, filed Apr. 14, 2008, Heil et al.
U.S. Appl. No. 12/118,272, filed May 9, 2008, Kuesel et al.
U.S. Appl. No. 12/118,039, filed May 9, 2008, Hoover et al.
U.S. Appl. No. 11/945,396, filed Nov. 27, 2007, Hoover et al.
U.S. Appl. No. 12/015,975, filed Jan. 17, 2008, Comparan et al.
U.S. Appl. No. 12/117,906, filed May 9, 2008, Hoover et al.
U.S. Appl. No. 12/233,180, filed Sep. 18, 2008, Hoover et al.
U.S. Appl. No. 12/113,286, filed May 1, 2008, Heil et al.
U.S. Appl. No. 11/955,553, filed Dec. 13, 2007, Comparan et al.
U.S. Appl. No. 12/031,738, filed Feb. 15, 2008, Hoover et al.
U.S. Appl. No. 11/972,753, filed Jan. 11, 2008, Mejdrich et al.
U.S. Appl. No. 12/060,559, filed Apr. 1, 2008, Comparan et al.
U.S. Appl. No. 11/926,212, filed Oct. 29, 2007, Hoover et al.
U.S. Appl. No. 12/118,298, filed May. 9, 2008, Heil et al.
U.S. Appl. No. 12/118,315, filed May 9, 2008, Mejdrich et al.
U.S. Appl. No. 11/938,376, filed Nov. 12, 2007, Mejdrich et al.
U.S. Appl. No. 12/121,168, filed May 15, 2008, Hoover et al.
Office Action Dated Jul. 20, 2009 in U.S. Appl. No. 12/031,733.
Kuskin, et al.; The Stanford Flash Multiprocessor; Jun. 6, 1996; Stanford University.
Nikolay Kvaldjiev et al., A Virtual Channel Network-on-chip for GT and BE traffic, Apr. 2006, IEEE Emerging VLSI Technologies and Architectures.
Office Action, U.S. Appl. No. 11/926,212, Dec. 7, 2010.
Office Action, U.S. Appl. No. 11/945,396, Dec. 9, 2010.
Notice of Allowance, U.S. Appl. No. 11/955,553, Nov. 22, 2010.
Notice of Allowance, U.S. Appl. No. 12/031,733, Nov. 16, 2010.
Office Action, U.S. Appl. No. 12/118,017, Dec. 8, 2010.
Office Action, U.S. Appl. No. 12/118,272, Dec. 2, 2010.
Office Action, U.S. Appl. No. 12/108,846, Dec. 2, 2010.
Final Office Action, U.S. Appl. No. 12/117,875, Nov. 10, 2010.
Office Action, U.S. Appl. No. 12/117,906, May 9, 2008.
Office Action, U.S. Appl. No. 12/060,559, Nov. 3, 2010.
Advisory Action, U.S. Appl. No. 11/926,212, Nov. 2, 2010.
Steve Furber, Future Trends in SOC Interconnect, Aug. 2000.
Bolotin, et al., The Power of Priority:NoC based Distributed Cache Coherency, May 21, 2007, IEEE, pp. 117-126.
Mereu, Gianni. "Conception, Analysis, Design and Realization of a Multi-socket Network-on-Chip Architecture and of the Binary Translation support for VLIW core targeted to Systems-on-Chip", Mar. 2007, 145 pages, accessible at http://www.diee.unica.it/driei/tesi/19_mereu.pdf.
Huneycutt et al. "Software Caching using Dynamic Binary Rewriting for Embedded Devices", 2001, Proceedings of the International Conference on Parallel Processing, 10 pages.
Cifuentes et al. "Walkabout—A Retargetable Dynamic Binary Translation Framework", Sun Microsystems Laboratories, Jan. 2002, 13 pages.
Issenin et al.; (Date Reuse Driven Memory and network-on-Chip Co-Synthesis); NSF; pp. 1-7.
Kavaldjiev et al. ("Providing QOS Guaranteed in a NOC by Virtual Channel Reservation"); 2006; pp. 1-12.
Monchiero ("Exploration of Distributed Shared Memory Architecture of NOC-Based Microprocessors", 2007) pp. 1-8.
Al-Hashimi; ("System-on-Chip- Net Generation Electronics", "Asynchronous on-chip networks"2006); Chapter 18 p. 1-32.
Final Office Action, U.S. Appl. No. 11/926,212, Aug. 23, 2010.
Final Office Action, U.S. Appl. No. 11/955,553, Sep. 13, 2010.
Final Office Action, U.S. Appl. No. 12,031,733, Aug. 19, 2010.
Notice of Allowance, U.S. Appl. No. 12/118,298, Aug. 18, 2010.
Office Action, U.S. Appl. No. 11/972,753, Oct. 4, 2010.
Office Action, U.S. Appl. No. 12/015,975, Jul. 22, 2010.
Office Action, U.S. Appl. No. 11/937,579, Sep. 16, 2010.
Office Action, U.S. Appl. No. 12/118,059, Sep. 1, 2010.
Office Action, U.S. Appl. No. 12/121,168, Oct. 5, 2010.

Master Dissertation, University of Electronic Science and Technology of China, pp. 0-35 and pp. 36-81 (includes English abstract).
1994-2010 China Academic Journal Electronic Publishing House, pp. 0-30 and pp. 31-66 (includes English abstract).
Final Office Action, U.S. Appl. No. 11/972,753, Feb. 18, 2011.
Final Office Action, U.S. Appl. No. 12/015,975, Jan. 7, 2011.
Final Office Action, U.S. Appl. No. 12/108,846, Feb. 17, 2011.
Final Office Action, U.S. Appl. No. 12/113,286, Feb. 18, 2011.
Final Office Action, U.S. Appl. No. 12/118,059, Feb. 17, 2011.

* cited by examiner

| Opcode | | | | | | | | Target Register | | | | | | | | Buffer Address | | | | | | | | Size | | | | | | | |
|---|---|---|---|---|---|---|---|---|---|---|---|---|---|---|---|---|---|---|---|---|---|---|---|---|---|---|---|---|---|---|---|
| 0 | | | | | | | 7 | 8 | | | | | | | 15 | 16 | | | | | | | 23 | 24 | | | | | | | 31 |

FIG. 4A     Instruction Load From Inbox 'LOAFI'

| Opcode | | | | | | | | Source Register | | | | | | | | Buffer Address | | | | | | | | Size | | | | | | | |
|---|---|---|---|---|---|---|---|---|---|---|---|---|---|---|---|---|---|---|---|---|---|---|---|---|---|---|---|---|---|---|---|
| 0 | | | | | | | 7 | 8 | | | | | | | 15 | 16 | | | | | | | 23 | 24 | | | | | | | 31 |

FIG. 4B     Instruction Store To Outbox 'STOTO'

NETWORK ON CHIP WITH LOW LATENCY, HIGH BANDWIDTH APPLICATION MESSAGING INTERCONNECTS THAT ABSTRACT HARDWARE INTER-THREAD DATA COMMUNICATIONS INTO AN ARCHITECTED STATE OF A PROCESSOR

BACKGROUND OF THE INVENTION

1. Field of the Invention

The field of the invention is data processing, or, more specifically apparatus and methods for data processing with a network on chip ('NOC').

2. Description Of Related Art

There are two widely used paradigms of data processing; multiple instructions, multiple data ('MIMD') and single instruction, multiple data ('SIMD'). In MIMD processing, a computer program is typically characterized as one or more hardware threads of execution operating more or less independently, each requiring fast random access to large quantities of shared memory. MIMD is a data processing paradigm optimized for the particular classes of programs that fit it, including, for example, word processors, spreadsheets, database managers, many forms of telecommunications such as browsers, for example, and so on.

SIMD is characterized by a single program running simultaneously in parallel on many processors, each instance of the program operating in the same way but on separate items of data. SIMD is a data processing paradigm that is optimized for the particular classes of applications that fit it, including, for example, many forms of digital signal processing, vector processing, and so on.

There is another class of applications, however, including many real-world simulation programs, for example, for which neither pure SIMD nor pure MIMD data processing is optimized. That class of applications includes applications that benefit from parallel processing and also require fast random access to shared memory. For that class of programs, a pure MIMD system will not provide a high degree of parallelism and a pure SIMD system will not provide fast random access to main memory stores.

SUMMARY OF THE INVENTION

Methods and apparatus for data processing on a network on chip ('NOC') that includes integrated processor ('IP') blocks, each of a plurality of the IP blocks including at least one computer processor, each such computer processor implementing a plurality of hardware threads of execution; low latency, high bandwidth application messaging interconnects; memory communications controllers; network interface controllers; and routers; each of the IP blocks adapted to a router through a separate one of the low latency, high bandwidth application messaging interconnects, a separate one of the memory communications controllers, and a separate one of the network interface controllers; each application messaging interconnect abstracting into an architected state of each processor, for manipulation by computer programs executing on the processor, hardware inter-thread communications among the hardware threads of execution; each memory communications controller controlling communication between an IP block and memory; each network interface controller controlling inter-IP block communications through routers.

The foregoing and other objects, features and advantages of the invention will be apparent from the following more particular descriptions of example embodiments of the invention as illustrated in the accompanying drawings wherein like reference numbers generally represent like parts of example embodiments of the invention.

BRIEF DESCRIPTION OF THE DRAWINGS

FIGS. 4A and 4B set forth schematic diagrams of two examples of single, machine-level computer program instructions useful in data processing on a NOC according to embodiments of the present invention.

DETAILED DESCRIPTION OF EXAMPLE EMBODIMENTS

Figure 1:
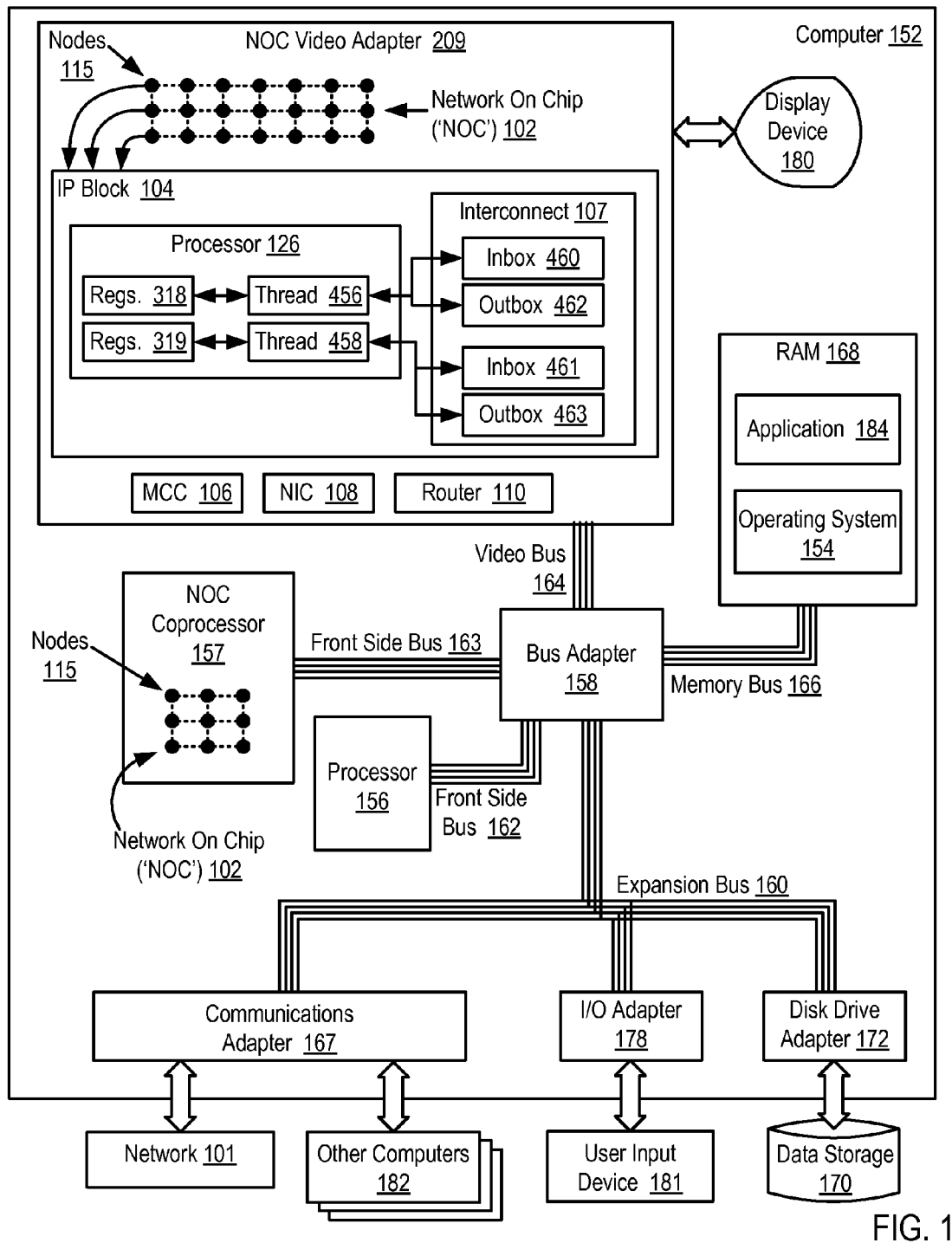
FIG. 1 sets forth a block diagram of automated computing machinery comprising an example of a computer useful in data processing with a NOC according to embodiments of the present invention.

Explanatory examples of apparatus and methods for data processing on a NOC in accordance with embodiments of the present invention are described with reference to the accompanying drawings, beginning with FIG. 1. FIG. 1 sets forth a block diagram of automated computing machinery comprising an example of a computer (152) useful for data processing with NOCs according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in main RAM (168) of the computer (152) is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful with computer processors and computer processor operations according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two examples of NOCs that carry out data processing according to embodiments of the present invention: a video adapter (209) and a coprocessor (157). The video adapter (209) is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus. The example NOC coprocessor (157) is connected to processor (156) through bus adapter (158), and front side buses (162 and 163), which is also a high speed bus. The NOC coprocessor of FIG. 1 is optimized to accelerate particular data processing tasks at the behest of the main processor (156).

Although for convenience of illustration, the NOC video adapter is shown in more detail than the NOC coprocessor, the structure and function of both NOCs are similar in several ways. The example NOC video adapter (209) and NOC coprocessor (157) of FIG. 1 each include a network on chip (102) composed of nodes (115) of processing and communications circuitry each of which includes an integrated processor ('IP') block (104), where some of the IP blocks include computer processors (126), and each such computer processor implements two or more hardware threads of execution (318, 319). The nodes typically include a low latency, high bandwidth application messaging interconnect (107) as well as memory communications controllers (106), network interface controllers (108), and routers (110). It is the routers and interconnections among the routers ('links') that make up the network aspect of the network on chip or 'NOC.' Each IP blocks (104) is adapted to a router (110) through a separate one of the low latency, high bandwidth application messaging interconnects (107), a separate one of the memory communications controllers (108), and a separate one of the network interface controllers (108). Each application messaging interconnect (107) abstracts into an architected state of a processor, for manipulation by computer programs executing on the processor, hardware inter-thread communications among the hardware threads of execution (318, 319). Each memory communications controller (106) controls communication between an IP block (104) and memory (168), and each network interface controller (108) controls inter-IP block communications through routers (110).

The example computer processor (126) in the example of FIG. 1 includes a number of hardware threads of execution (318, 319). The threads are 'pipelined' in the sense that the processor (126) is configured to support execution within the processor of more than one computer program instruction at the same time. The threads of execution are hardware threads in that hardware support for the threads is built into the processor itself in the form of a separate instruction queue and a separate architectural register set (318, 319) for each thread, so that each thread can execute simultaneously with no need for context switches among the threads. Each such hardware thread can run multiple software threads of execution implemented with the software threads assigned to portions of processor time called 'quanta' or 'time slots' and context switches that save the contents of a set of architectural registers for a software thread during periods when that software thread loses possession of its assigned hardware thread.

Each hardware thread (318, 319) in the example of FIG. 1 includes computer program instructions that execute in each hardware thread. Each such computer program instruction is composed of an operation code or 'opcode' and one or more operands or instruction parameters that advise the processor how to execute the opcode, where to obtain the input data for execution of an opcode, where to place the results of execution of an opcode, and so on. The opcode itself is the portion of a machine language instruction, represented as mnemonic text in assembly language, that specifies the operation to be performed. An opcode's specification and format are typically defined by the instruction set architecture of the particular processor for which the opcode is to be used. Apart from the opcode itself, an instruction normally also has one or more specifiers for operands or parameters, such as data, on which the operation should be performed, although some operations may have implicit operands, or none at all. Depending on architecture, the operands may be register values, values in the stack, other memory values, I/O ports, and so on, specified and accessed using addressing modes. The types of operations include arithmetic, data copying, logical operations, and program control, as well as special instructions. Depending on the context, the terms "computer program instruction," "program instruction," and "instruction" are used generally throughout this specification as synonyms. The terms "thread of execution" and "thread" are similarly used as synonyms in this specification. Moreover, unless the context specifically says otherwise, the terms "thread of execution" and "thread" in this specification always refer to hardware threads. More details of NOC structure and operation, hardware threads, and so on, are discussed below in this specification.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers with computer processors and computer processor operations according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful with computer processors and computer processor operations according to embodiments of the present invention include modems for wired dial-up communications, Ethernet (IEEE 802.3) adapters for wired data communications network communications, and 802.11 adapters for wireless data communications network communications.

Figure 2:
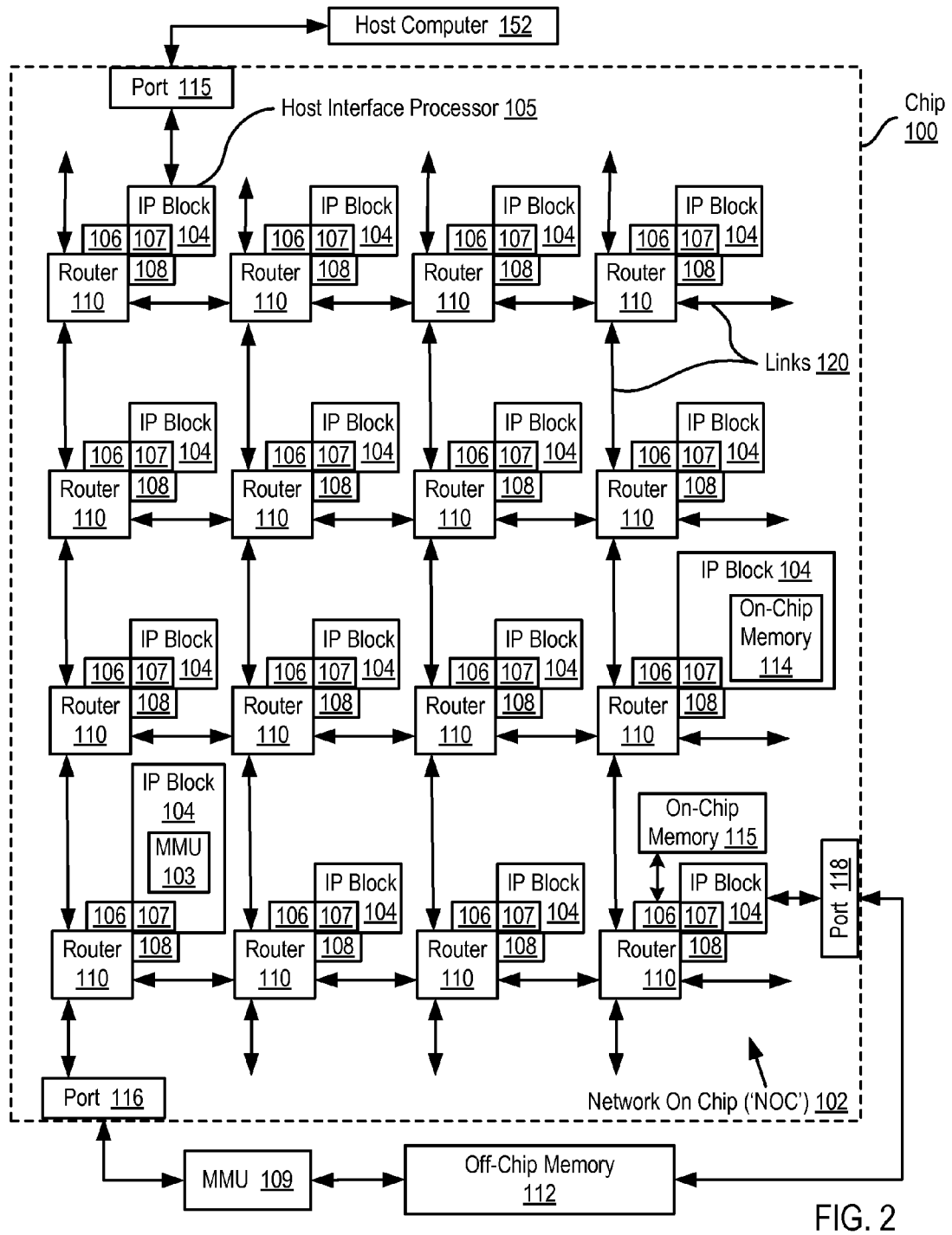
FIG. 2 sets forth a functional block diagram of an example NOC according to embodiments of the present invention.

For further explanation, FIG. 2 sets forth a functional block diagram of an example NOC (102) according to embodiments of the present invention. The NOC in the example of FIG. 1 is implemented on a 'chip' (100), that is, on an integrated circuit. The NOC (102) of FIG. 2 includes integrated processor ('IP') blocks (104), low latency, high bandwidth application messaging interconnects (107), memory communications controllers (106), and network interface controllers (108), and routers (110). It is the routers and interconnections among the routers ('links') (120) that make up the network aspect of the network on chip or 'NOC.' Each IP block (104) is adapted to a router (110) through a separate one of the low latency, high bandwidth application messaging interconnects (107), a separate one of the memory communications controllers (108), and a separate one of the network interface controllers (108). Each memory communications controller (106) controls communication between an IP block (104) and memory (168), and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. In the example of FIG. 2, at least some of the IP blocks (104) implement as a component of the IP block a generally-programmable microprocessor that supports two or more hardware threads of execution according to embodiments of the present invention.

In the example of FIG. 2, each IP block includes a low latency, high bandwidth application messaging interconnect (107) that adapts the IP block to the network for purposes of data communications among IP blocks. Each application messaging interconnect (107) abstracts into an architected state of a microprocessor in its IP block, for manipulation by computer programs executing on the microprocessor, hardware inter-thread communications among hardware threads of execution. As described in more detail below, each such messaging interconnect includes an inbox and an outbox, where each inbox and outbox is composed of sequential and non-sequential logic, dedicated to use by one hardware thread of execution, and configured to send or receive inter-thread communications through the network of a NOC to or from inboxes or outboxes of other hardware threads of execution.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packets structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wise, 512 wires. In addition, each link is bidirectional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller (106) in the example of FIG. 2 controls communications between an IP block and memory. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory-addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC includes two memory management units ('MMUs') (103, 109), illustrating two alternative memory architectures for NOCs according to embodiments of the present invention. MMU (103) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (103, 109), data communications port (118) illustrates a third memory architecture useful in NOCs according to embodiments of the present invention. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the link structure of the NOC coprocessor (157) and the protocol required for the front side bus (163) between the NOC coprocessor (157) and the bus adapter (158).

Figure 3:
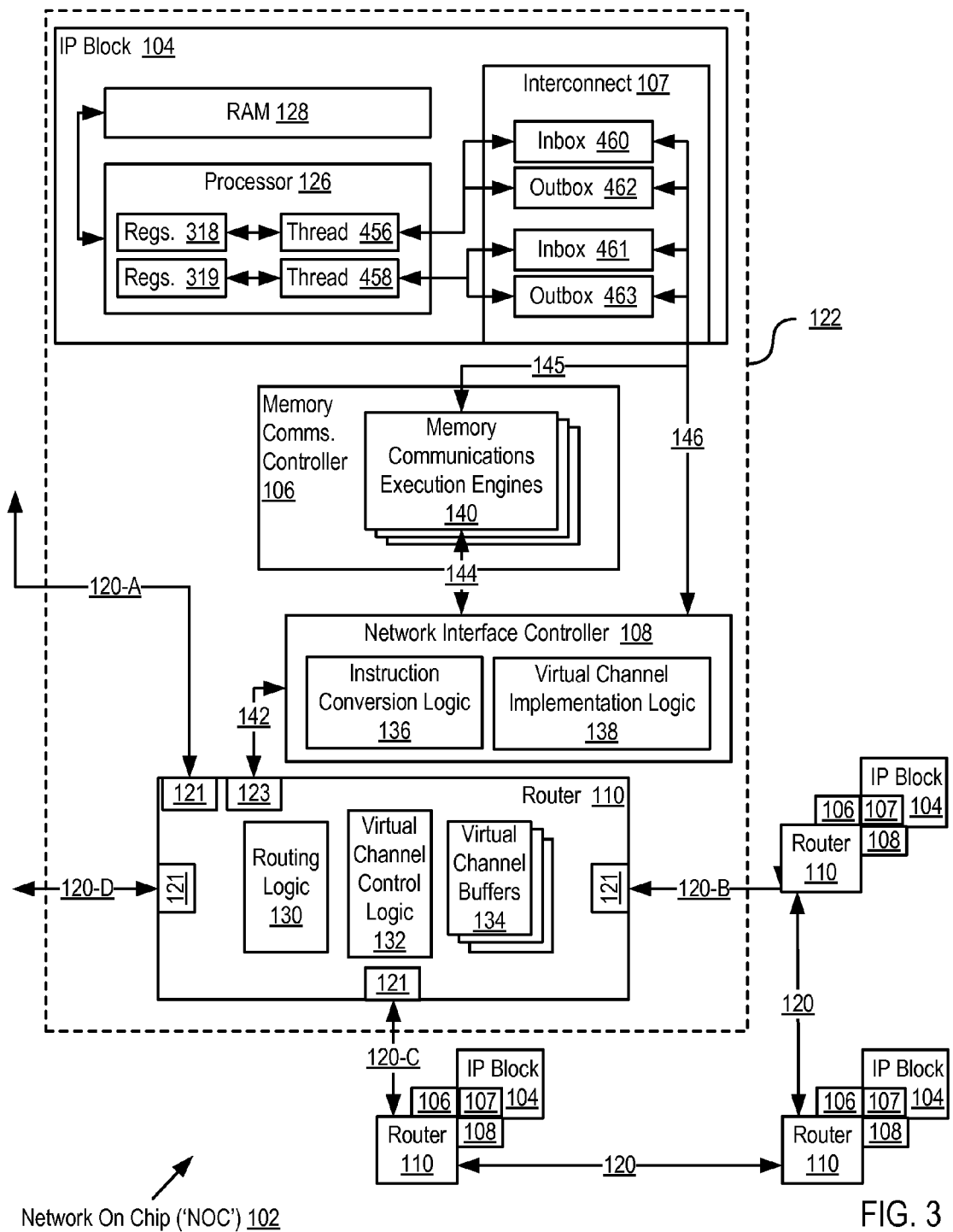
FIG. 3 sets forth a functional block diagram of a further example NOC according to embodiments of the present invention.

For further explanation, FIG. 3 sets forth a functional block diagram of a further example NOC according to embodiments of the present invention. The example NOC of FIG. 3 is similar to the example NOC of FIG. 2 in that the example NOC of FIG. 3 is implemented on a chip (100 on FIG. 2), and the NOC (102) of FIG. 2 includes integrated processor ('IP') blocks (104), low latency, high bandwidth application messaging interconnects (107), memory communications controllers (106), and network interface controllers (108), and routers (110). In the example of FIG. 3, at least some of the IP blocks (104) implement as a component of the IP block a generally-programmable computer processor or microprocessor (126) that supports two or more hardware threads of execution (456, 458) according to embodiments of the present invention. Each application messaging interconnect (107) abstracts into an architected state of a microprocessor (126) in its IP block (104), for manipulation by computer programs executing on the microprocessor, hardware inter-thread communications among hardware threads of execution. Inter-thread communications are message traffic, either memory-address-based or network-addressed, directed from one thread of execution to another, so that the destination network address can expressly include the identity of a destination hardware thread of execution. It is the routers and interconnections among the routers ('links') (120) that make up the network aspect of the network on chip or 'NOC.' Each IP block (104) is adapted to a router (110) through a separate one of the low latency, high bandwidth application messaging interconnects (107), a separate one of the memory communications controllers (108), and a separate one of the network interface controllers (108). Each memory communications controller (106) controls communication between an IP block (104) and memory (168), and each network interface controller (108) controls inter-IP block communications through routers (110).

In the example of FIG. 3, each application messaging interconnect (107) includes outboxes (462, 463) and inboxes (460, 461), where each outbox and each inbox is composed of sequential and non-sequential logic configured to effect inter-thread communications, that is, data communications between hardware threads of execution. Each outbox (462, 463) is configured to send inter-thread communications through the network to inboxes of other hardware threads of execution, and each inbox (460, 461) is configured to receive inter-thread communications through the network from outboxes of other hardware threads of execution. Such inter-thread communications can be among threads of separate processors on separate IP blocks or among threads on the same processor on the same IP block. Each hardware thread of execution (456, 458) has dedicated to it for its use in data communications a separate one of the outboxes and a separate one of the inboxes. In this example, hardware thread (456) has dedicated for its exclusive use in data communications inbox (460) and outbox (462), and hardware thread (458) has dedicated for its exclusive use in data communications inbox (461) and outbox (463). For ease of explanation, the example of FIG. 3 illustrates for an IP block (104) only two hardware threads (456, 458), two outboxes (462, 463), and two inboxes (460, 461), but readers will recognize that IP blocks in NOCs may be implemented within the scope of the present invention with any number of hardware threads, outboxes, and inboxes as may occur to those of skill in the art.

In the example of FIG. 3, each application messaging interface (107) abstracts hardware inter-thread communications into an architected state of a processor, that is, a processor in the IP block in which the application messaging interface (107) is located. The communications are abstracted into an architectural state in the sense that each application messaging interface (107) is configured to receive from a hardware thread of execution (456, 458), in the process of executing a store-type computer program instruction, message data for transmission to another thread of execution. The store-type computer program instruction originates from an architectural register of the processor, and the communications data is provided to the interconnect from an architectural register of the processor. In the presence of so much potential parallelism as is presented by a NOC architecture, readers will recognize that the architectural registers can include vector registers, and communications data can be provided from such vector registers as well as from vector register lanes, where a vector register lane is a defined portion of a vector register, for example, vector_register_27(0:127)={lane_x(0:31), lane_y (0:31), lane_z(0:31), lane_w(0:31)}.

In this example, the computer program instruction is characterized as a 'store-type' instruction because it is of a type used to move data generally in the direction from a processing element to memory, or, in this example, from a thread of execution to a message buffer in an outbox. An application messaging interface (107) is configured to receive such message data through its outboxes (462, 463), each of which is accessible in this example by its dedicated thread of execution through a single, machine-level computer program instruction. In this sense, abstracting hardware inter-thread communications into an architected state of a processor is carried out by a hardware thread's accessing its dedicated outbox through a single, machine-level computer program instruction, which in turn includes sending by the outbox inter-thread communications through the network of the NOC to an inbox of another hardware thread of execution.

Also in the example of FIG. 3, each application messaging interface abstracts hardware inter-thread communications into an architected state of a processor, that is, a processor in the IP block in which the application messaging interface (107) is located, in the sense that each application messaging interface sends to its hardware thread of execution through an architectural register of the processor, in the process of executing a load-type computer program instruction, message data received from another thread of execution. The load-type computer program instruction originates from an architectural register of the processor, and the return of communications data from the interconnect is to an architectural register of the processor. In a similar manner as described above for the store-type instruction, the architectural registers can include vector registers, and communications data can be returned to such vector registers as well as returned to vector register lanes within the vector registers.

In this example, the computer program instruction is characterized as a 'load-type' instruction because it is of a type used to move data generally in the direction from memory to a processing element, or, in this example, from a message buffer in an inbox to a thread of execution. An application messaging interface (107) is configured to send such message data from its inboxes, each of which is accessible in this example by its dedicated thread of execution through a single, machine-level computer program instruction. In this sense, abstracting hardware inter-thread communications into an architected state of a processor is carried out by a hardware thread's accessing its dedicated inbox through a single, machine-level computer program instruction, which in turn includes receiving by the inbox inter-thread communications through the network from an outbox of another hardware thread of execution.

For further explanation, FIGS. 4A and 4B set forth schematic diagrams of two examples of single, machine-level computer program instructions useful in data processing on a NOC according to embodiments of the present invention. An opcode implemented as a single, machine-level computer program instruction is a binary code at the machine level that is represented by a mnemonic text at the software level, an opcode of an assembly language at the lowest software level closest to the hardware, and other textual computer program instructions in higher level computer programming languages. A compiler would convert such higher level computer program instructions to the assembly language opcode, and an assembler would convert the assembly language opcode to the binary form as a single, machine-level computer program instruction to be loaded from an architectural register into a hardware thread of execution in a processor according to embodiments of the present invention. Abstracting hardware inter-thread communications into an architected state of a processor, therefore, means exposing to computer software through architectural registers fast access to data communications hardware functions, in particular through a low latency, high bandwidth application messaging interface with outbox and inbox functionality.

FIG. 4A sets forth a schematic diagram of an example of a single, machine-level computer program instruction useful as a load-type instruction by a hardware thread of execution for loading received communications data from a message buffer of an inbox into architectural registers of a processor. In binary form, the example load-type computer program instruction of FIG. 4A is a 32-bit instruction composed of an 8-bit opcode disposed in bits 0-7 and three parameters, an 8-bit identifier of a target register in bits 8-15, an 8-bit buffer address in bits 16-23, and an 8-bit size parameter disposed in bits 24-31. The target register parameter identifies an architectural register to which communications data is to be loaded from a message buffer in an inbox. The buffer address specifies a location within a message buffer from which communications data is to be loaded to the target architectural register. And the size parameter specifies a quantity of communications data to be loaded from the message buffer of an inbox to the target architectural register. In this example, there is no need to specify the inbox; in an architecture with an inbox dedicated to each hardware thread, the inbox from which communications data is to be loaded to an architectural register is the inbox dedicated to the hardware thread from which the load-type instruction issues. In addition to expression in binary, the instruction can also be expressed as an assembler mnemonic, 'LOAFT,' standing for 'load from inbox,' for example—or in a higher level language as a function signature such as, for example:

errorCode loadFromInbox(targetRegister, bufferAddress, size).

FIG. 4B sets forth a schematic diagram of an example of a single, machine-level computer program instructions useful as a store-type instruction by a hardware thread of execution for storing communications data for transmission from architectural registers of a processor into a message buffer of an outbox. In binary form, the example computer program store-type instruction of FIG. 4B is a 32-bit instruction composed of an 8-bit opcode disposed in bits 0-7 and three parameters, an 8-bit identifier of a source register in bits 8-15, an 8-bit buffer address in bits 16-23, and an 8-bit size parameter disposed in bits 24-31. The source register parameter identifies an architectural register from which communications data is to be stored to a message buffer in an inbox. The buffer address specifies a location within a message buffer to which communications data is to be stored from the source architectural register. And the size parameter specifies a quantity of communications data to be stored to the message buffer of an outbox from the source architectural register. In this example, there is no need to specify the outbox; in an architecture with an outbox dedicated to each hardware thread, the outbox to which communications data is to be loaded from a source architectural register is the outbox dedicated to the hardware thread from which the store-type instruction issues. In addition to expression in binary, the store-type instruction can also be expressed as an assembler mnemonic, 'STOTO,' standing for 'store to outbox,' for example—or in a higher level language as a function signature such as, for example:

errorCode storeToOutbox(sourceRegister, bufferAddress, size).

Again with reference to the example NOC of FIG. 3: Each IP block (104) is adapted to a router (110) through a separate one of the low latency, high bandwidth application messaging interconnects (107), a separate one of the memory communications controllers (106), and a separate one of the network interface controllers (108). Each application messaging interconnect (107), as described above, abstracts into an architected state of each processor, for manipulation by computer programs executing on the processor, hardware inter-thread communications among the hardware threads of execution. Each application messaging interconnect (107) abstracts into the architectural state both communications between an IP block and memory and also inter-IP block communications. Each memory communications controller controls communications between an IP block and memory, and each network interface controller (108) controls inter-IP block communications through routers (110). In the example of FIG. 3, one set (122) of an IP block (104) adapted to a router (110) through an application messaging interconnect (107), a memory communications controller (106) and a network interface controller (108) is expanded to aid a more detailed explanation of their structure and operations. All the IP blocks, application messaging interconnects, memory communications controllers, network interface controllers, and routers in the example of FIG. 3 are configured in the same manner as the expanded set (122).

In the example of FIG. 3, each IP block (104) includes a computer processor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks as generally programmable microcomputers. In the example of FIG. 3, each IP block includes a low latency, high bandwidth application messaging interconnect (107) that adapts the IP block to the network for purposes of data communications among IP blocks. Each such messaging interconnect includes an inbox (460) and an outbox (462).

Each IP block also includes a computer processor (126) according to embodiments of the present invention, a computer processor that includes a plurality of hardware threads of execution (456, 458), each thread comprising a plurality of computer program instructions. The threads (456, 458) are 'pipelined' in that the processor is configured with the capability of executing within the processor more than one instruction at the same time, regardless of which thread of execution issues an instruction. The threads are hardware threads in that the support for the threads is built into the processor itself in the form of a separate architectural register set (318, 319) for each thread (456, 458), so that each thread can execute simultaneously with no need for context switches among the threads. Each such hardware thread (456, 458) can run multiple software threads of execution implemented with the software threads assigned to portions of processor time called 'quanta' or 'time slots' and context switches that save the contents of a set of architectural registers for a software thread during periods when that software thread loses possession of its assigned hardware thread.

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block and to a particular hardware thread of execution in a processor on the other IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address and the identity of the hardware thread of execution to which the message is to be directed through routers of the NOC. Such network-addressed communications are passed by the IP block through it I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type. Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-addressed messages, request messages, responses to request messages, invalidate messages directed to caches; memory load and store messages; and responses to memory load messages, and so on.

Each router (110) in the example of FIG. 3 includes routing logic (130), virtual channel control logic (132), and virtual channel buffers (134). The routing logic typically is implemented as a network of synchronous and asynchronous logic that implements a data communications protocol stack for data communication in the network formed by the routers (110), links (120), and bus wires among the routers. The routing logic (130) includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports (121) connected through bus wires (120-A, 120-B, 120-C, 120-D) to other routers and a fifth port (123) connecting each router to its associated IP block (104) through a network interface controller (108) and a memory communications controller (106).

In describing memory-address-based communications above, each memory address is mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-addressed communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x,y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-addressed messages, request messages, responses to request messages, invalidate messages directed to caches; memory load and store messages; and responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

Figure 5:
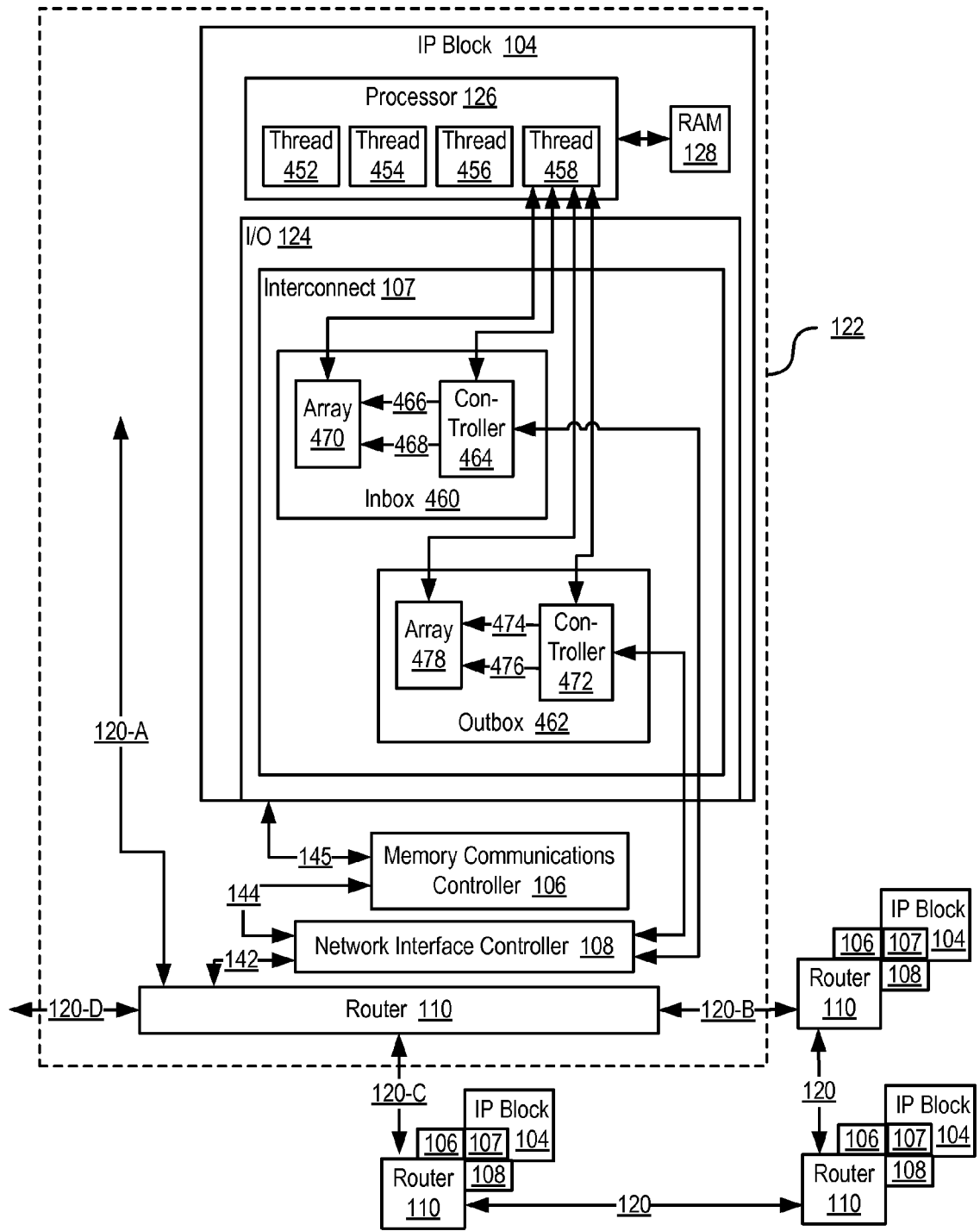
FIG. 5 sets forth a functional block diagram of a further example NOC according to embodiments of the present invention.

For further explanation, FIG. 5 sets forth a functional block diagram of a further example NOC according to embodiments of the present invention. The example NOC of FIG. 5 is similar to the example NOC of FIG. 2 in that the example NOC of FIG. 5 is implemented on a chip (100 on FIG. 2), and the NOC (102) of FIG. 5 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the example of FIG. 5, each IP block includes a low latency, high bandwidth application messaging interconnect (107) that adapts the IP block to the network for purposes of data communications among IP blocks, including abstracting into an architected state of each processor, for manipulation by computer programs executing on the processor, hardware inter-thread communications among the hardware threads of execution. The low latency, high bandwidth application messaging interconnect (107) is an interconnect in the sense that it is composed of sequential and non-sequential logic that connects an IP block (104) to a network interface controller (108) for purposes of data communications. The low latency, high bandwidth application messaging interconnect (107) is a low latency, high bandwidth interconnect in that it provides a very fast interconnection between the IP block and the network interface controller—so fast because from the point of view of the IP block, for outgoing messages, the process of sending a message to the network interface controller represents a single immediate store operation to high speed local memory in the outbox array (478), and receiving a message in the IP block (104) from the network interface controller (108) represents a single load operation from a high speed local memory in the inbox array (470). As described in more detail below, each such messaging interconnect (107) includes an inbox (460) and an outbox (462). In the example of FIG. 5, one set (122) of an IP block (104) adapted to a router (110) through an application messaging interconnect (107), a memory communications controller (106) and network interface controller (108) is expanded to aid a more detailed explanation of the structure and operations of the messaging interconnect (107). All the IP blocks, memory communications controllers, network interface controllers, and routers in the example of FIG. 5 are configured in the same manner as the expanded set (122).

In the example NOC of FIG. 5, each outbox (462) includes an array (478) of memory indexed by an outbox write pointer (474) and an outbox read pointer (476). Each outbox (462) also includes an outbox message controller (472). In the example NOC of FIG. 5, the outbox (462) is dedicated to exclusive use by one associated hardware thread of execution (458) on a processor of the IP block. Each such dedicated hardware thread of execution (458) is enabled to store message data into message buffers in the array (478) and to provide to the outbox message controller (472) message control information, including message destination identification and an indication that message data in the array (478) is ready to be sent. The message control information, such as destination address or message identification, and other control information such as 'ready to send,' may be written to registers in the outbox message controller (472) or such information may be written into the array (478) itself as part of the message data, in a message header, message meta-data, or the like.

The outbox message controller (472) is implemented as a network of sequential and non-sequential logic that is enabled to set the outbox write pointer (474). The outbox write pointer (474) may be implemented, for example, as a register in the outbox message controller (472) that stores the memory address of the location in the array where the associated hardware thread of execution is authorized to write message data. The outbox message controller (472) is also enabled to set the outbox read pointer (476). The outbox read pointer (476) may be implemented, for example, as a register in the outbox message controller (472) that stores the memory address of the location in the array where the outbox message controller is to read its next message data for transmission over the network from the outbox.

The outbox message controller (472) is also enabled to send to the network message data stored into the array (478)

by the hardware thread of execution (458) associated with the outbox (462). In the NOC (102) of FIG. 5, each network interface controller (108) is enabled to convert communications instructions from command format to network packet format for transmission among the IP blocks (104) through routers (110). The communications instructions are formulated in command format by the associated hardware thread of execution (458) in the IP block (104) and provided by the outbox message controller (472) to the network interface controller (108) in command format. The command format is a native format that conforms to architectural register files of the IP block (104) and the outbox message controller (472). The network packet format is the format required for transmission through routers (110) of the network. Each such message is composed of one or more network packets. Such communications instructions may include, for example, communications instructions that send messages among IP blocks carrying data and instructions for processing the data among IP blocks in parallel applications and in pipelined applications.

In the example NOC of FIG. 5, each inbox (460) includes an array (470) of memory indexed by an inbox write pointer (466) and an inbox read pointer (468). Each inbox (460) also includes an inbox message controller (464). The inbox message controller (454) is implemented as a network of sequential and non-sequential logic that is enabled to set the inbox write pointer (466). The inbox write pointer (466) may be implemented, for example, as a register in the inbox message controller (454) that stores the memory address of the beginning location in the array (470) where message data from an outbox of another IP block is to be written. The inbox message controller (454) is also enabled to set the inbox read pointer (468). The inbox read pointer (468) may be implemented, for example, as a register in the inbox message controller (454) that stores the memory address of the beginning location in the array (470) where an associated hardware thread of execution (458) may read the next message received from an outbox of some other IP block.

In the example NOC of FIG. 5, the inbox is dedicated to exclusive use by an associated hardware thread of execution (458) a processor (126) of the IP block. Each such associated hardware thread of execution (458) is enabled to load from the array message data sent from some other outbox of another IP block. The hardware thread of execution may be notified that message data sent from another outbox of another IP block has been written into the array by the message controller through a flag set in a status register, for example.

The inbox message controller (454) is also enabled to receive from the network message data written to the network from an outbox of another IP block and provide to a hardware thread of execution (458) associated with the inbox (460) the message data received from the network. The inbox message controller of FIG. 5 receives from a network interface controller (108) message data from an outbox of some other IP block and writes the received message data to the array (470). Upon writing the received message data to the array, the inbox message controller (464) is also enabled to notify the hardware thread of execution (458) associated with the inbox that message data has been received from the network by, for example, setting a data-ready flag in a status register of the inbox message controller (454). The associated hardware thread of execution may, for example, 'sleep until flag' before a message load, or a load opcode can be configured to check a data-ready flag in the inbox message controller.

Figure 6:
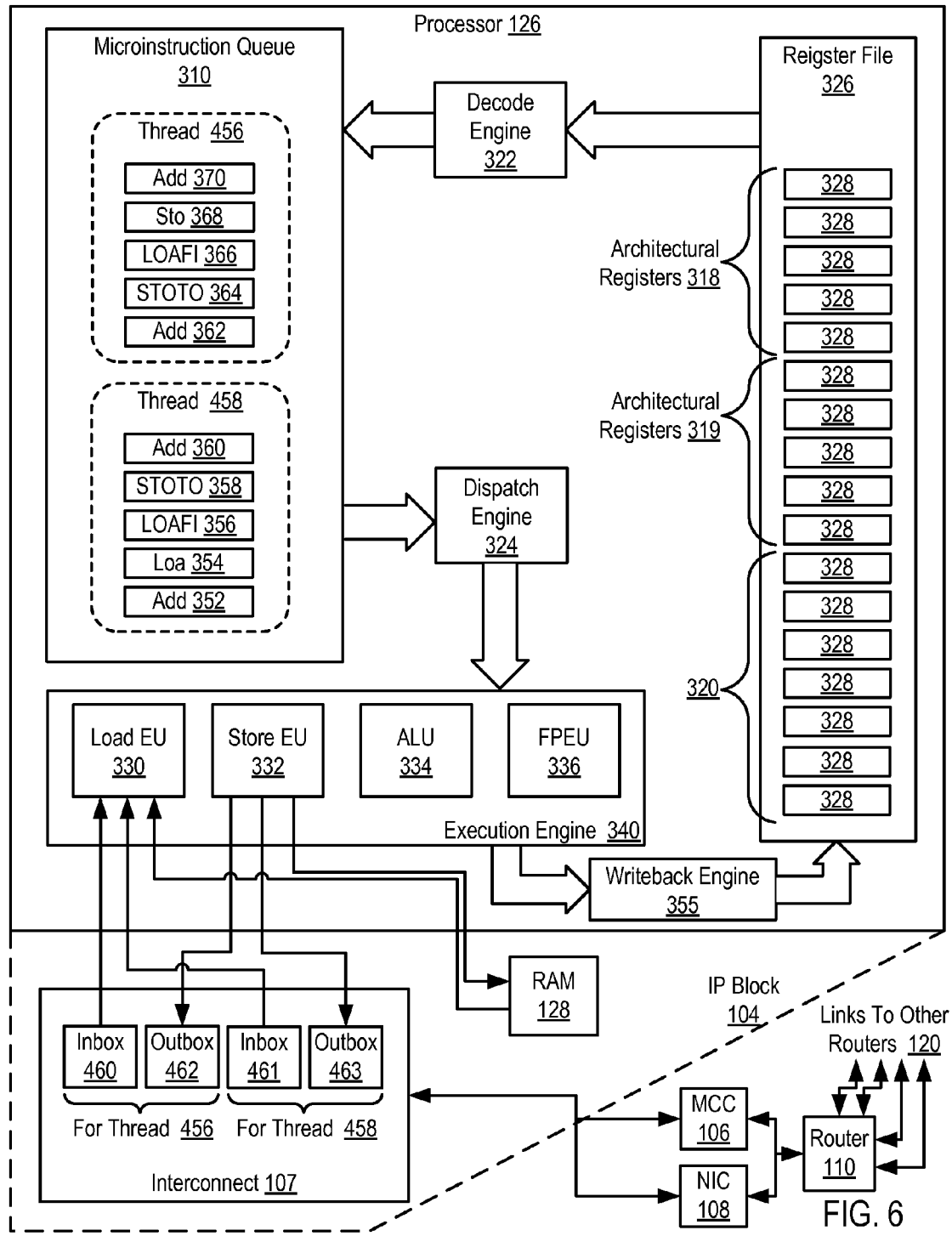
FIG. 6 sets forth a functional block diagram of an example of a computer processor useful for data processing on a NOC according to embodiments of the present invention.

For further explanation, FIG. 6 sets forth a functional block diagram of an example computer processor (126) useful for data processing on a NOC according to embodiments of the present invention. The processor (126) in this example includes a plurality of hardware threads of execution (456, 458), each thread comprising a plurality of computer program instructions (352-360, 362-370). The threads (456, 458) are pipelined in that the processor is configured with execution units (330, 332, 334, 336) in an execution engine (340) so that the processor can have under execution within the processor more than one instruction at the same time. The threads are hardware threads in that the support for the threads is built into the processor itself in the form of a separate architectural register set (318, 319) for each thread (456, 458), so that each thread can execute simultaneously with no need for context switches among the threads. Each such hardware thread (456, 458) can run multiple software threads of execution implemented with the software threads assigned to portions of processor time called 'quanta' or 'time slots' and context switches that save the contents of a set of architectural registers for a software thread during periods when that software thread loses possession of its assigned hardware thread.

The processor (126) in this example includes a register file (326) made up of all the registers (328) of the processor. The register file (326) is an array of processor registers implemented, for example, with fast static memory devices. The registers include registers (320) that are accessible only by the execution units as well as two sets of 'architectural registers' (318, 319), one set for each hardware thread (456, 458). The instruction set architecture of processor (126) defines a set of registers, the 'architectural registers,' that are used to stage data between memory and the execution units in the processor. The architectural registers are the registers that are accessible directly by user-level computer program instructions, instruction registers, status flag registers, program counter registers, memory address index registers, and so on.

The processor (126) includes a decode engine (322), a dispatch engine (324), an execution engine (340), and a writeback engine (355). Each of these engines is a network of static and dynamic logic within the processor (126) that carries out particular functions for pipelining program instructions internally within the processor.

The processor's decode engine (322) is a network of static and dynamic logic within the processor (156) that retrieves, for purposes of pipelining program instructions internally within the processor, instructions from registers in the architectural register sets (318, 319) and decodes each instructions into one or more microinstructions for execution on execution units (325) within the processor. Just as a single high level language instruction is compiled and assembled to a series of machine instructions (load, store, shift, etc), each machine instruction is in turn implemented by a series of microinstructions. Such a series of microinstructions is sometimes called a 'microprogram' or 'microcode.' The microinstructions are sometimes referred to as 'micro-operations,' 'micro-ops,' or 'μops'—although in this specification, a microinstruction is generally referred to as a 'microinstruction,' a 'computer instruction,' or simply as an 'instruction.'

Microprograms are carefully designed and optimized for the fastest possible execution, since a slow microprogram would yield a slow machine instruction which would in turn cause all programs using that instruction to be slow. Microinstructions, for example, may specify such fundamental operations as the following:
    Connect Register 1 to the "A" side of the ALU
    Connect Register 7 to the "B" side of the ALU
    Set the ALU to perform two's-complement addition
    Set the ALU's carry input to zero
    Store the result value in Register 8

Update the "condition codes" with the ALU status flags ("Negative", "Zero", "Overflow", and "Carry")

Microjump to MicroPC nnn for the next microinstruction

For a further example: A typical assembly language instruction to add two numbers, such as, for example, ADD A, B, C, may add the values found in memory locations A and B and then put the result in memory location C. In processor (126), the decode engine (322) may break this user-level instruction into a series of microinstructions similar to:

LOAD A, Reg1
LOAD B, Reg2
ADD Reg1, Reg2, Reg3
STORE Reg3, C

It is these microinstructions that are then placed in the microinstruction queue (310) by the decode engine (322) to be dispatched to execution units.

Processor (126) also includes a dispatch engine (324) that carries out the work of dispatching individual microinstructions from the microinstruction queue to execution units. The dispatch engine (324) is a network of static and dynamic logic within the processor (156) that dispatches, for purposes of pipelining program instructions internally within the processor, microinstructions to execution units (325) in the processor (156). The processor (126) includes an execution engine (340) that in turn includes several execution units, a load memory instruction execution unit (330), a store memory instruction execution unit (332), an ALU (334), and a floating point execution unit (336). Execution units in the execution engine (340) execute the microinstructions, and the writeback engine (355) writes the results of execution back into the correct architectural registers (318, 319) in the register file (326).

The example processor (126) of FIG. 6 is implemented as a component of an IP block (104) on an integrated circuit or 'chip' as part of a NOC. In addition to the processor (126), the IP block (104) includes a low latency, high bandwidth application messaging interconnects (107) and local RAM (128). The IP block (104) is adapted to a router (110) through the low latency, high bandwidth application messaging interconnect (107), a memory communications controller (108), and a network interface controller (108). The memory communications controller (106) controls communication between the IP block (104) and memory, and the network interface controller (108) controls inter-IP block communications through the router (110). The application messaging interconnect (107) abstracts into an architected state of the processor (126), for manipulation by computer programs executing on the processor, hardware inter-thread communications among hardware threads of execution—both among threads in different IP blocks and among threads in the same IP block. The router (110) along with other routers and the interconnections among the routers ('links') (120) make up the network aspect of a NOC.

In the example of FIG. 6, the application messaging interconnect (107) includes outboxes (462, 463) and inboxes (460, 461), where each outbox and each inbox is composed of sequential and non-sequential logic configured to effect inter-thread communications, that is, data communications between hardware threads of execution. Each outbox (462, 463) is configured to send inter-thread communications through the network to inboxes of other hardware threads of execution, and each inbox (460, 461) is configured to receive inter-thread communications through the network from outboxes of other hardware threads of execution. As mentioned, such inter-thread communications can be among threads of separate processors on separate IP blocks or among threads on the same processor on the same IP block. Each hardware thread of execution (456, 458) has dedicated to it for its use in data communications a separate one of the outboxes and a separate one of the inboxes. In this example, hardware thread (456) has dedicated for its exclusive use in data communications inbox (460) and outbox (462), and hardware thread (458) has dedicated for its exclusive use in data communications inbox (461) and outbox (463). For ease of explanation, the example of FIG. 6 illustrates for an IP block (104) only two hardware threads (456, 458), two outboxes (462, 463), and two inboxes (460, 461), but readers will recognize that IP blocks in NOCs may be implemented within the scope of the present invention with any number of hardware threads, outboxes, and inboxes as may occur to those of skill in the art.

In the example of FIG. 6, the application messaging interface (107) abstracts hardware inter-thread communications into an architected state of the processor (126). The communications are abstracted into an architectural state in the sense that each application messaging interface (107) is configured to receive from a hardware thread of execution (456, 458), in the process of executing a store-type computer program instruction, message data for transmission to another thread of execution. The store-type computer program instruction originates from an architectural register (318, 319) of the processor, and the communications data is provided to the interconnect from an architectural register of the processor. The computer program instruction is characterized as a 'store-type' instruction because it is of a type used to move data generally in the direction from a processing element to memory, or, in this example, from a thread of execution to a message buffer in an outbox. An application messaging interface (107) is configured to receive such message data through its outboxes (462, 463), each of which is accessible in this example by its dedicated thread of execution through a single, machine-level computer program instruction. In this sense, abstracting hardware inter-thread communications into an architected state of a processor is carried out by a hardware thread's accessing its dedicated outbox through a single, machine-level computer program instruction, which in turn includes sending by the outbox inter-thread communications through the network of the NOC to an inbox of another hardware thread of execution. In this example, each thread (456, 458) has such a store-type instruction ('STOTO') (364, 358) enqueued for execution, and the dispatch engine (324) will in turn dispatch each such instruction to the Store Execution Unit (332) which will in turn store communications data for each STOTO instruction from architectural registers to a message buffer in an outbox, to outbox (462) for STOTO instruction (364), to outbox (463) for STOTO instruction (358).

Also in the example of FIG. 6, the application messaging interface (107) abstracts hardware inter-thread communications into an architected state of a processor in the sense that each application messaging interface sends to its hardware thread of execution through an architectural register (318, 319) of the processor, in the process of executing a load-type computer program instruction, message data received from another thread of execution. The load-type computer program instruction originates from an architectural register of the processor, and the return of communications data from the interconnect is to an architectural register of the processor. The computer program instruction is characterized as a 'load-type' instruction because it is of a type used to move data generally in the direction from memory to a processing element, or, in this example, from a message buffer in an inbox to a thread of execution. An application messaging interface (107) is configured to send such message data from its inboxes, each of which is accessible in this example by its dedicated thread of execution through a single, machine-level computer program instruction. In this sense, abstracting hardware inter-thread communications into an architected state of a processor is carried out by a hardware thread's accessing its dedicated inbox through a single, machine-level computer program instruction, which in turn includes receiving by the inbox inter-thread communications through the network from an outbox of another hardware thread of execution. In this example, each thread (456, 458) has such a load-type instruction ('LOAFI') (366, 356) enqueued for execution, and the dispatch engine (324) will in turn dispatch each such instruction to the Load Execution Unit (330) which will in turn load communications data for each LOAFI instruction from a message buffer of an inbox to architectural registers, from inbox (460) for LOAFI instruction (366), from inbox (461) for LOAFI instruction (356).

Figure 7:
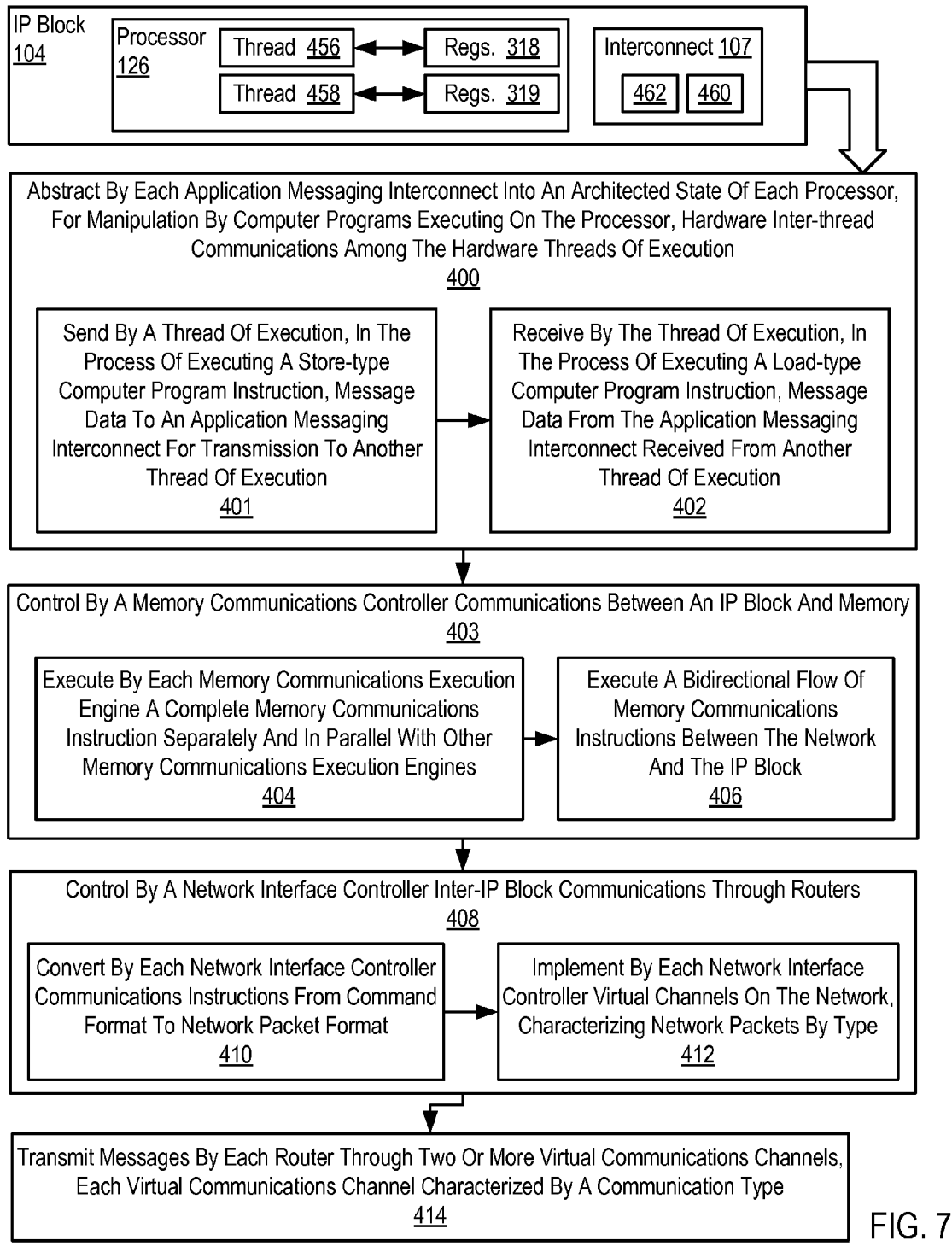
FIG. 7 sets forth a flow chart illustrating an example of a method for data processing with a NOC according to embodiments of the present invention.

For further explanation, FIG. 7 sets forth a flow chart illustrating an example of a method for data processing with a NOC according to embodiments of the present invention. The method of FIG. 7 is implemented on a NOC similar to the ones described above in this specification, a NOC (102 on FIG. 3) that is implemented on a chip (100 on FIG. 3) with IP blocks (104 on FIG. 3) where a plurality of the IP blocks include a computer processor (126 on FIG. 3) and each such computer processor implements a plurality of hardware threads of execution (456, 458); low latency, high bandwidth application messaging interconnects (107 on FIG. 3); memory communications controllers (106 on FIG. 3); network interface controllers (108 on FIG. 3); and routers (110 on FIG. 3). Each IP block (104 on FIG. 3) is adapted to a router (110 on FIG. 3), and therefore to the network of the NOC, through a separate one of the low latency, high bandwidth application messaging interconnects (107 on FIG. 3), a separate one of the memory communications controllers (106 on FIG. 3), and a separate one of the network interface controllers (108 on FIG. 3). In the method of FIG. 7, each IP block (104) may be implemented as a reusable unit of synchronous or asynchronous logic design used as a building block for data processing within the NOC.

The method of FIG. 7 includes abstracting (400) by each application messaging interconnect (107) into an architected state of each processor (126), for manipulation by computer programs executing (352-370 on FIG. 6) on the processor (126), hardware inter-thread communications among the hardware threads of execution. The inter-thread communications are data communications message on the network of the NOC, either memory-addressed messages communications from an outbox of a thread through a memory communications controller to an inbox of another thread or network-addressed messages communicated from an outbox of a thread through a network interface controller to an inbox of another thread. Each thread of execution has dedicated for its exclusive use one outbox (462) and one inbox (460) of a low latency, high bandwidth application messaging interconnect (107). Each processor (126) supports one or more opcodes that can be included in computer programs as computer program instructions executed through a hardware thread of execution (456, 458) to store communications data from an architectural register (318, 319) into an outbox (462) and load communications data to an architectural register (318, 319) from an inbox (462). Abstracting hardware inter-thread communications into an architected state of a processor, therefore, means exposing to computer software through architectural registers fast access to data communications hardware functions, in particular through a low latency, high bandwidth application messaging interface with outbox and inbox functionality. Abstracting (400) hardware inter-thread communications into an architected state of each processor in the example of FIG. 7, then, is carried out by sending (401) by a hardware thread of execution, in the process of executing a store-type computer program instruction, message data to an application messaging interconnect (107) for transmission to another thread of execution and receiving (402) by the hardware thread of execution, in the process of executing a load-type computer program instruction, message data from the application messaging interconnect (107) received from another thread of execution.

The method of FIG. 7 also includes controlling (403) by a memory communications controller (106 on FIG. 3) communications between an IP block and memory. In the method of FIG. 7, the memory communications controller includes a plurality of memory communications execution engines (140 on FIG. 3). Also in the method of FIG. 7, controlling (403) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 7, memory communications instructions may include translation lookaside buffer control instructions, cache control instructions, barrier instructions, memory load instructions, and memory store instructions. In the method of FIG. 7, memory may include off-chip main RAM, memory connected directly to an IP block through a memory communications controller, on-chip memory enabled as an IP block, and on-chip caches.

The method of FIG. 7 also includes controlling (408) by a network interface controller (108 on FIG. 3) inter-IP block communications through routers. In the method of FIG. 7, controlling (408) inter-IP block communications also includes converting (410) by each network interface controller communications instructions from command format to network packet format and implementing (412) by each network interface controller virtual channels on the network, including characterizing network packets by type.

The method of FIG. 7 also includes transmitting (414) messages by each router (110 on FIG. 3) through two or more virtual communications channels, where each virtual communications channel is characterized by a communication type. Communication instruction types, and therefore virtual channel types, include, for example: inter-IP block network-addressed messages, request messages, responses to request messages, invalidate messages directed to caches; memory load and store messages; and responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

Figure 8:
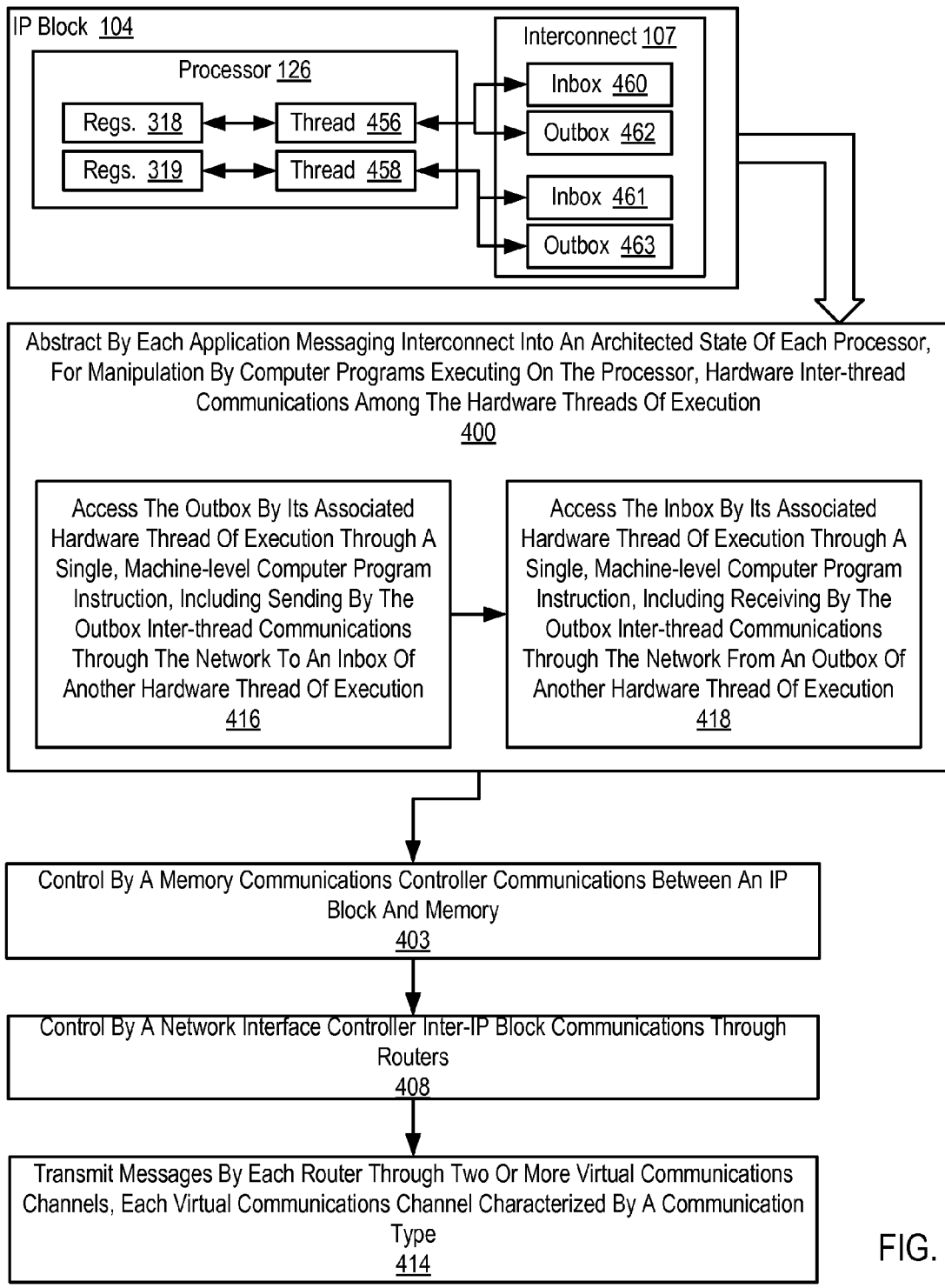
FIG. 8 sets forth a flow chart illustrating a further example of a method for data processing with a NOC according to embodiments of the present invention.

For further explanation, FIG. 8 sets forth a flow chart illustrating a further example of a method for data processing with a NOC according to embodiments of the present invention. The method of FIG. 8 is similar to the method of FIG. 7 in that the method of FIG. 8 is implemented on a NOC similar to the ones described above in this specification, a NOC (102 on FIG. 3) that is implemented on a chip (100 on FIG. 3) with IP blocks (104 on FIG. 3) where a plurality of the IP blocks include a computer processor (126 on FIG. 3) and each such computer processor implements a plurality of hardware threads of execution (456, 458); low latency, high bandwidth application messaging interconnects (107 on FIG. 3); memory communications controllers (106 on FIG. 3); network interface controllers (108 on FIG. 3); and routers (110 on FIG. 3). Each IP block (104 on FIG. 3) is adapted to a router (110 on FIG. 3), and therefore to the network of the NOC, through a separate one of the low latency, high bandwidth application messaging interconnects (107 on FIG. 3), a separate one of the memory communications controllers (106 on FIG. 3), and a separate one of the network interface controllers (108 on FIG. 3). In the method of FIG. 7, each IP block (104) may be implemented as a reusable unit of synchronous or asynchronous logic design used as a building block for data processing within the NOC. Like the method of FIG. 7, the method of FIG. 8 includes controlling (403) by a memory communications controller (106 on FIG. 3) communications between an IP block and memory, controlling (408) by a network interface controller (108 on FIG. 3) inter-IP block communications through routers, and transmitting (414) messages by each router (110 on FIG. 3) through two or more virtual communications channels, each of which operates in a similar manner as described above with reference to the method of FIG. 7.

The method of FIG. 8 also includes abstracting (400) by each application messaging interconnect (107) into an architected state of each processor (126), for manipulation by computer programs executing (352-370 on FIG. 6) on the processor (126), hardware inter-thread communications among the hardware threads of execution, although, the process of abstracting (400) hardware inter-thread communications into an architected state of a processor operates somewhat differently here than in the method of FIG. 7. The inter-thread communications still are data communications message on the network of the NOC, either memory-addressed messages communications from an outbox of a thread through a memory communications controller to an inbox of another thread or network-addressed messages communicated from an outbox of a thread through a network interface controller to an inbox of another thread. And each thread of execution has dedicated for its exclusive use one outbox (462) and one inbox (460) of a low latency, high bandwidth application messaging interconnect (107). In this example, thread (456) has dedicated for its exclusive use inbox (460) and outbox (462), and thread (458) has dedicated for its exclusive use inbox (461) and outbox (463). Each processor (126) supports one or more opcodes, each opcode implemented as a single, machine-level computer program instruction, that can be included in computer programs as computer program instructions executed through a hardware thread of execution (456, 458) to store communications data from an architectural register (318, 319) into an outbox (462) and load communications data to an architectural register (318, 319) from an inbox (462).

An opcode implemented as a single, machine-level computer program instruction is a binary code at the machine level that is represented by a mnemonic text at the software level, an opcode of an assembly language at the lowest software level closest to the hardware, and other textual computer program instructions in higher level computer programming languages. A compiler would convert such higher level computer program instructions to the assembly language opcode, and an assembler would convert the assembly language opcode to the binary form as a single, machine-level computer program instruction to be loaded from an architectural register into a hardware thread of execution in a processor according to embodiments of the present invention.

Abstracting hardware inter-thread communications into an architected state of a processor, therefore, again means exposing to computer software through architectural registers fast access to data communications hardware functions, in particular through a low latency, high bandwidth application messaging interface with outbox and inbox functionality. And abstracting (400) hardware inter-thread communications into an architected state of each processor in the example of FIG. 7, then, is carried out by accessing (416) an outbox (462) by its hardware thread of execution (456) through a single, machine-level computer program instruction, including sending by the outbox (462) inter-thread communications through the network of the NOC to an inbox of another hardware thread of execution and accessing (418) an inbox (460) by its hardware thread of execution (456) through a single, machine-level computer program instruction, including receiving by the inbox (460) inter-thread communications through the network from an outbox of another hardware thread of execution.

Figure 9:
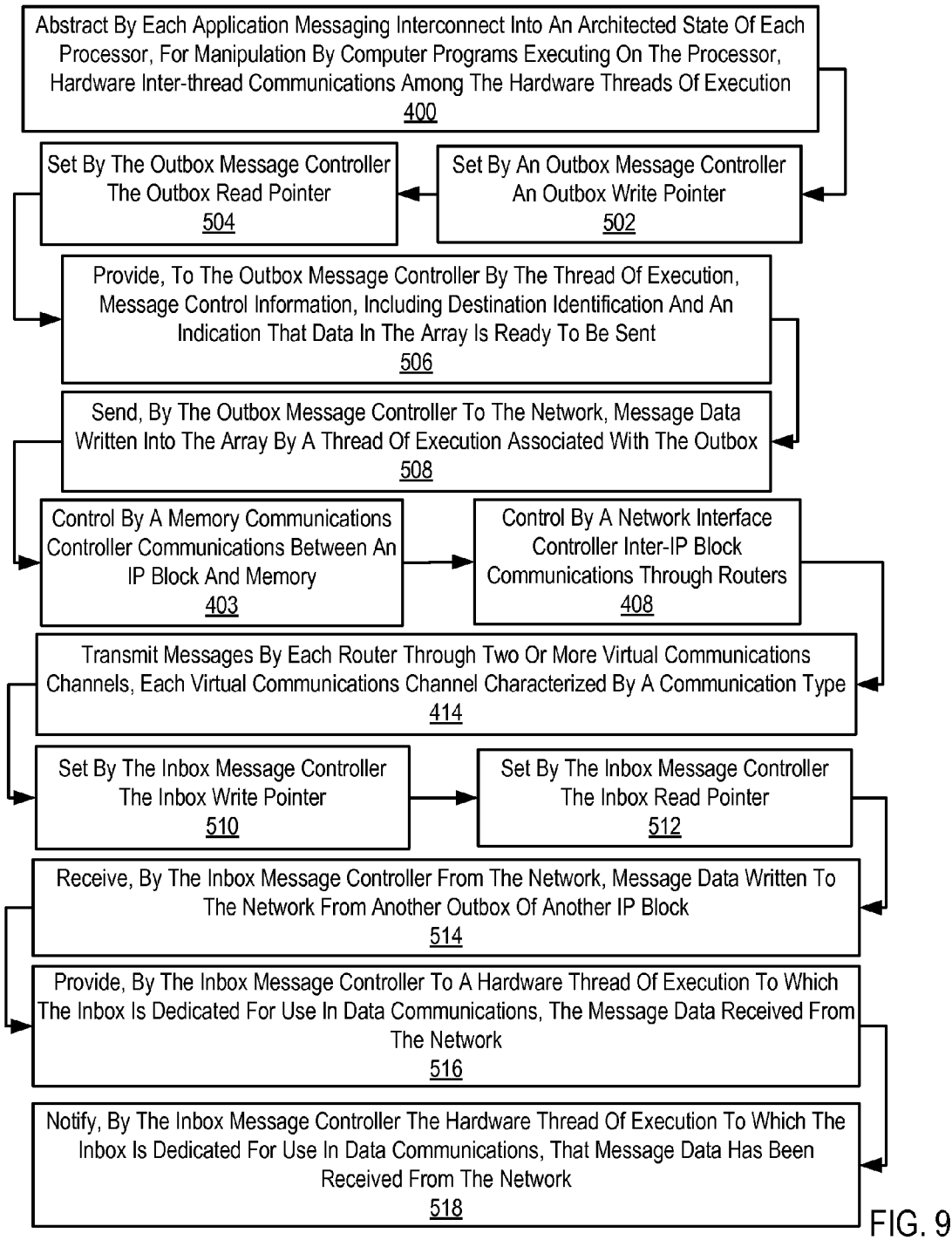
FIG. 9 sets forth a flow chart illustrating a further example of a method for data processing with a NOC according to embodiments of the present invention.

For further explanation, FIG. 9 sets forth a flow chart illustrating a further example of a method for data processing with a NOC according to embodiments of the present invention. The method of FIG. 9 is similar to the method of FIG. 7 in that the method of FIG. 9 is implemented on a NOC similar to the ones described above in this specification, a NOC (102 on FIG. 3) that is implemented on a chip (100 on FIG. 3) with IP blocks (104 on FIG. 3) where a plurality of the IP blocks include a computer processor (126 on FIG. 3) and each such computer processor implements a plurality of hardware threads of execution (456, 458); low latency, high bandwidth application messaging interconnects (107 on FIG. 3); memory communications controllers (106 on FIG. 3); network interface controllers (108 on FIG. 3); and routers (110 on FIG. 3). Each IP block (104 on FIG. 3) is adapted to a router (110 on FIG. 3), and therefore to the network of the NOC, through a separate one of the low latency, high bandwidth application messaging interconnects (107 on FIG. 3), a separate one of the memory communications controllers (106 on FIG. 3), and a separate one of the network interface controllers (108 on FIG. 3).

In the method of FIG. 9, each IP block (104 on FIG. 3) may be implemented as a reusable unit of synchronous or asynchronous logic design used as a building block for data processing within the NOC, and each low latency, high bandwidth application messaging interconnect (107 on FIG. 5) includes an inbox (460 on FIG. 5) and an outbox (462 on FIG. 5). In the method of FIG. 9, each outbox (462 on FIG. 5) includes an outbox message controller (472 on FIG. 5) and an array (478 on FIG. 5) for storing message data, with the array indexed by an outbox write pointer (474 on FIG. 5) and an outbox read pointer (476 on FIG. 5). In the method of FIG. 9, each inbox (460 on FIG. 5) includes an inbox message controller (464 on FIG. 5) and an array (470 on FIG. 5) for storing message data, with the array (470 on FIG. 5) indexed by an inbox write pointer (466 on FIG. 5) and an inbox read pointer (468 on FIG. 5).

The method of FIG. 9, like the method of FIG. 7, includes the following method steps which operate in a similar manner as described above with regard to the method of FIG. 7: abstracting (400) by each application messaging interconnect (107) into an architected state of each processor (126), for manipulation by computer programs executing (352-370 on FIG. 6) on the processor (126), hardware inter-thread communications among the hardware threads of execution; controlling (403) by each memory communications controller communications between an IP block and memory; controlling (408) by each network interface controller inter-IP block communications through routers; and transmitting (414) messages by each router (110 on FIG. 3) through two or more virtual communications channels, where each virtual communications channel is characterized by a communication type.

In addition to its similarities to the method of FIG. 7, however, the method of FIG. 9 also includes setting (502) by the outbox message controller the outbox write pointer. The outbox write pointer (474 on FIG. 5) may be implemented, for example, as a register in the outbox message controller (472 on FIG. 5) that stores the memory address of the location in the array where the associated hardware thread of execution is authorized to write message data.

The method of FIG. 9 also includes setting (504) by the outbox message controller the outbox read pointer. The outbox read pointer (476 on FIG. 5) may be implemented, for example, as a register in the outbox message controller (472 on FIG. 5) that stores the memory address of the location in the array where the outbox message controller is to read its next message data for transmission over the network from the outbox.

The method of FIG. 9 also includes providing (506), to the outbox message controller by the hardware thread of execution, message control information, including destination identification and an indication that data in the array is ready to be sent. The message control information, such as destination address or message identification, and other control information such as 'ready to send,' may be written to registers in the outbox message controller (472 on FIG. 5) or such information may be written into the array (478 on FIG. 5) itself as part of the message data, in a message header, message meta-data, ready-to-send flag, or the like.

The method of FIG. 9 also includes sending (508), by the outbox message controller to the network, message data written into the array by a hardware thread of execution associated with the outbox. In the NOC upon which the method of FIG. 9 is implemented, each network interface controller (108 on FIG. 5) is enabled to convert communications instructions from command format to network packet format for transmission among the IP blocks (104 on FIG. 5) through routers (110 on FIG. 5). The communications instructions are formulated in command format by the associated hardware thread of execution (458 on FIG. 5) in the IP block (104 on FIG. 5) and provided by the outbox message controller (472 on FIG. 5) to the network interface controller (108 on FIG. 5) in command format. The command format is a native format that conforms to architectural register files of the IP block (104 on FIG. 5) and the outbox message controller (472 on FIG. 5). The network packet format is the format required for transmission through routers (110 on FIG. 5) of the network. Each such message is composed of one or more network packets. Such communications instructions may include, for example, communications instructions that send messages among IP blocks carrying data and instructions for processing the data among IP blocks in parallel applications and in pipelined applications.

The method of FIG. 9 also includes setting (510) by the inbox message controller the inbox write pointer. The inbox write pointer (466 on FIG. 5) may be implemented, for example, as a register in the inbox message controller (454 on FIG. 5) that stores the memory address of the beginning location in the array (470 on FIG. 5) where message data from an outbox of another IP block is to be written.

The method of FIG. 9 also includes setting (512) by the inbox message controller the inbox read pointer. The inbox read pointer (468 on FIG. 5) may be implemented, for example, as a register in the inbox message controller (454 on FIG. 5) that stores the memory address of the beginning location in the array (470 on FIG. 5) where an associated hardware thread of execution (456 on FIG. 5) may read the next message received from an outbox of some other IP block.

The method of FIG. 9 also includes receiving (514), by the inbox message controller from the network, message data written to the network from another outbox of another IP block, and providing (516), by the inbox message controller to a hardware thread of execution associated with the inbox, the message data received from the network. The inbox message controller (454 on FIG. 5) is enabled to receive from the network message data written to the network from an outbox of another IP block and provide to a hardware thread of execution (456 on FIG. 5) associated with the inbox (460 on FIG. 5) the message data received from the network. The inbox message controller of FIG. 5 receives from a network interface controller (108 on FIG. 5) message data from an outbox of some other IP block and writes the received message data to the array (470 on FIG. 5).

The method of FIG. 9 also includes notifying (518), by the inbox message controller the hardware thread of execution associated with the inbox, that message data has been received from the network. Upon writing the received message data to the array, an inbox message controller (464 on FIG. 5) is also enabled to notify the hardware thread of execution (456 on FIG. 5) associated with the inbox that message data has been received from the network by, for example, setting a data-ready flag in a status register of the inbox message controller (454 on FIG. 5). The associated hardware thread of execution may, for example, 'sleep until flag' before a message load, or a load opcode can be configured to check a data-ready flag in the inbox message controller.

Example embodiments of the present invention are described largely in the context of a fully functional computer system for data processing on a NOC. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A network on chip ('NOC') comprising:
   integrated processor ('IP') blocks, each of a plurality of the IP blocks including at least one computer processor, each such computer processor implementing a plurality of hardware threads of execution; low latency, high bandwidth application messaging interconnects; memory communications controllers; network interface controllers; and routers;
   each of the IP blocks adapted to a router through a separate one of the low latency, high bandwidth application messaging interconnects, a separate one of the memory communications controllers, and a separate one of the network interface controllers;
   each application messaging interconnect abstracting into an architected state of each processor, for manipulation by computer programs executing on the processor, hardware inter-thread communications among the hardware threads of execution; each memory communications controller controlling communication between an IP block and memory;
   each network interface controller controlling inter-IP block communications through routers.

2. The NOC of claim 1 wherein each application messaging interface abstracting hardware inter-thread communications into an architected state of each processor further comprises:
   each application messaging interface receiving from a hardware thread of execution, in the process of executing a store-type computer program instruction, message data for transmission to another thread of execution; and
   each application messaging interface sending to the hardware thread of execution, in the process of executing a load-type computer program instruction, message data received from another thread of execution.

3. The NOC of claim 1 wherein each application messaging interconnect further comprises outboxes and inboxes, each hardware thread of execution having dedicated to it for its use in data communications a separate one of the outboxes and a separate one of the inboxes, each outbox and each inbox comprising sequential and non-sequential logic configured to effect inter-thread communications.

4. The NOC of claim 1 wherein the application messaging interconnect further comprises an outbox dedicated to use by a single one of the hardware threads of execution, the outbox further comprising sequential and non-sequential logic configured to send inter-thread communications through the network to inboxes of other hardware threads of execution.

5. The NOC of claim 1 wherein the application messaging interconnect further comprises an inbox dedicated to use by a single one of the hardware threads of execution, the inbox further comprising sequential and non-sequential logic configured to receive inter-thread communications through the network from outboxes of other hardware threads of execution.

6. The NOC of claim 1 wherein each application messaging interconnect further comprises an outbox dedicated to use by a single one of the hardware threads of execution, the outbox comprising sequential and non-sequential logic configured to send inter-thread communications through the network to inboxes of other hardware threads of execution, the outbox accessible by its hardware thread of execution through a single, machine-level computer program instruction.

7. The NOC of claim 1 wherein each application messaging interconnect further comprises an inbox dedicated to use by a single one of the hardware threads of execution, the inbox comprising sequential and non-sequential logic configured to receive inter-thread communications through the network from outboxes of other hardware threads of execution, the inbox accessible by its hardware thread of execution through a single, machine-level computer program instruction.

8. The NOC of claim 1 wherein each application messaging interconnect further comprises an outbox, the outbox comprising an array indexed by an outbox write pointer and an outbox read pointer, the outbox further comprising an outbox message controller enabled to set the outbox write pointer, set the outbox read pointer, and send to the network message data written into the array by a hardware thread of execution to which the outbox is dedicated for use in data communications.

9. The NOC of claim 8 wherein the hardware thread of execution is enabled to provide message control information, including destination identification and an indication that data in the array is ready to be sent.

10. The NOC of claim 1 wherein each application messaging interconnect further comprises an inbox, the inbox comprising an array indexed by an inbox write pointer and an inbox read pointer, the inbox further comprising an inbox message controller enabled to set the inbox write pointer, set the inbox read pointer, receive from the network message data written to the network from another outbox of another IP block, and provide to a hardware thread of execution to which the inbox is dedicated for use in data communications the message data received from the network.

11. The NOC of claim 10 wherein the inbox message controller is enabled to notify the hardware thread of execution to which the inbox is dedicated for use in data communications that message data has been received from the network.

12. A method of data processing with a network on chip ('NOC'), the NOC comprising integrated processor ('IP') blocks, each of a plurality of the IP blocks including a computer processor, each such computer processor implementing a plurality of hardware threads of execution; low latency, high bandwidth application messaging interconnects; memory communications controllers; network interface controllers; and routers; each of the IP blocks adapted to a router through a separate one of the low latency, high bandwidth application messaging interconnects, a separate one of the memory communications controllers, and a separate one of the network interface controllers; the method comprising:
   abstracting by each application messaging interconnect into an architected state of each processor, for manipulation by computer programs executing on the processor, hardware inter-thread communications among the hardware threads of execution;
   controlling by each memory communications controller communication between an IP block and memory;
   controlling by each network interface controller inter-IP block communications through routers.

13. The method of claim 12 wherein abstracting hardware inter-thread communications into an architected state of each processor further comprises:
   sending by a hardware thread of execution, in the process of executing a store-type computer program instruction, message data to an application messaging interconnect for transmission to another thread of execution; and
   receiving by the hardware thread of execution, in the process of executing a load-type computer program instruction, message data from the application messaging interconnect received from another thread of execution.

14. The method of claim 12 wherein each application messaging interconnect further comprises outboxes and inboxes, each hardware thread of execution having dedicated to it for use in data communications a separate one of the outboxes and a separate one of the inboxes, each outbox and each inbox comprising sequential and non-sequential logic configured to effect inter-thread communications.

15. The method of claim 12 wherein the application messaging interconnect further comprises an outbox dedicated to use by a single one of the hardware threads of execution, the outbox comprising sequential and non-sequential logic configured to send inter-thread communications through the network to inboxes of other hardware threads of execution.

16. The method of claim 12 wherein the application messaging interconnect further comprises an inbox dedicated to use by a single one of the hardware threads of execution, the inbox further comprising sequential and non-sequential logic configured to receive inter-thread communications through the network from outboxes of other hardware threads of execution.

17. The method of claim 12 wherein each application messaging interconnect comprises an outbox dedicated to use by a single one of the hardware threads of execution, the outbox comprises sequential and non-sequential logic circuitry, and abstracting hardware inter-thread communications into an architected state of each processor further comprises:
    accessing the outbox by its hardware thread of execution through a single, machine-level computer program instruction, including sending by the outbox inter-thread communications through the network to an inbox of another hardware thread of execution.

18. The method of claim 12 wherein each application messaging interconnect further comprises an inbox dedicated to use by a single one of the hardware threads of execution, the inbox comprises sequential and non-sequential logic circuitry, and abstracting hardware inter-thread communications into an architected state of each processor further comprises:
    accessing the inbox by its hardware thread of execution through a single, machine-level computer program instruction, including receiving by the inbox inter-thread communications through the network from an outbox of another hardware thread of execution.

19. The method of claim 12 wherein each application messaging interconnect further comprises an outbox, the outbox comprises an array indexed by an outbox write pointer and an outbox read pointer, the outbox further comprises an outbox message controller, and the method further comprises:
    setting by the outbox message controller the outbox write pointer;
    setting by the outbox message controller the outbox read pointer; and
    sending, by the outbox message controller to the network, message data written into the array by a hardware thread of execution to which the outbox is dedicated for use in data communications.

20. The method of claim 19 further comprising providing, to the outbox message controller by the hardware thread of execution to which the outbox is dedicated, message control information, including destination identification and an indication that data in the array is ready to be sent.

21. The method of claim 12 wherein each application messaging interconnect further comprises an inbox, the inbox comprises an array indexed by an inbox write pointer and an inbox read pointer, the inbox further comprises an inbox message controller, and the method further comprises:
    setting by the inbox message controller the inbox write pointer;
    setting by the inbox message controller the inbox read pointer;
    receiving, by the inbox message controller from the network, message data written to the network from another outbox of another IP block; and
    providing, by the inbox message controller to a hardware thread of execution to which the inbox is dedicated for use in data communications, the message data received from the network.

22. The method of claim 21 further comprising notifying, by the inbox message controller the hardware thread of execution to which the inbox is dedicated for use in data communications, that message data has been received from the network.

* * * * *